Dec. 17, 1968     C. L. FREDERICK     3,416,365
METHOD OF DETERMINING ELASTIC PROPERTIES OF A METAL SAMPLE
Filed Sept. 28, 1965     5 Sheets-Sheet 1
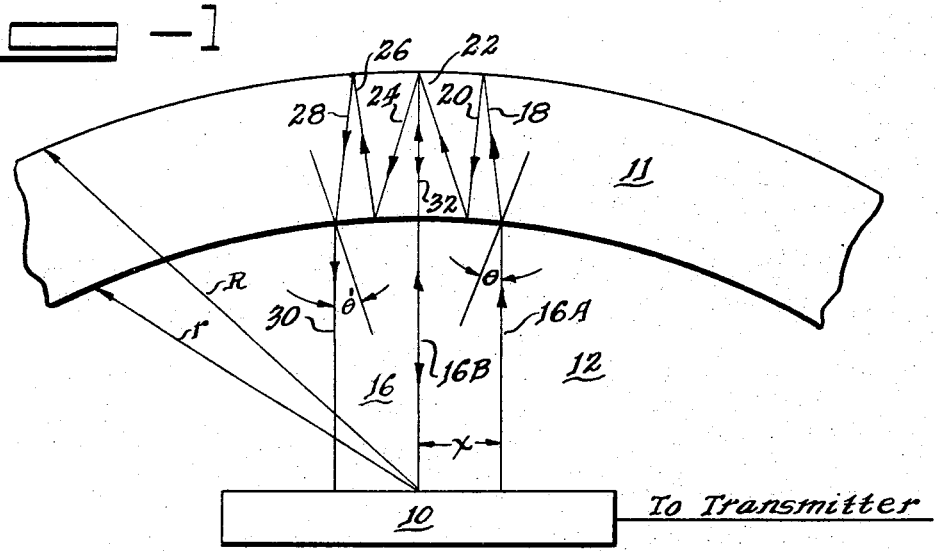
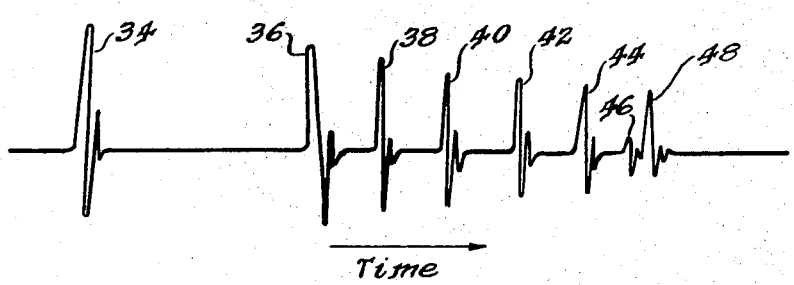
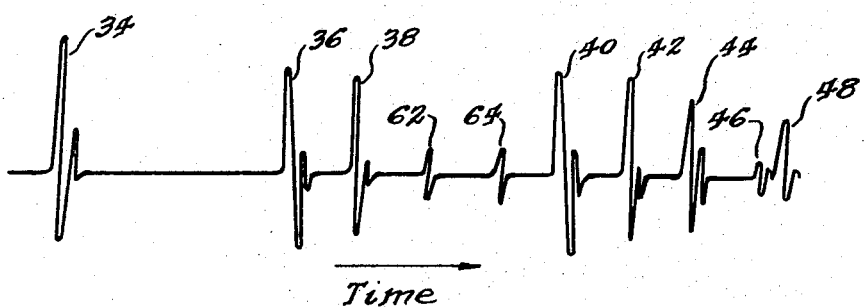
INVENTOR.
Charles L. Frederick
BY
Roland A. Anderson
Attorney Dec. 17, 1968  C. L. FREDERICK  3,416,365
METHOD OF DETERMINING ELASTIC PROPERTIES OF A METAL SAMPLE
Filed Sept. 28, 1965  5 Sheets-Sheet 2
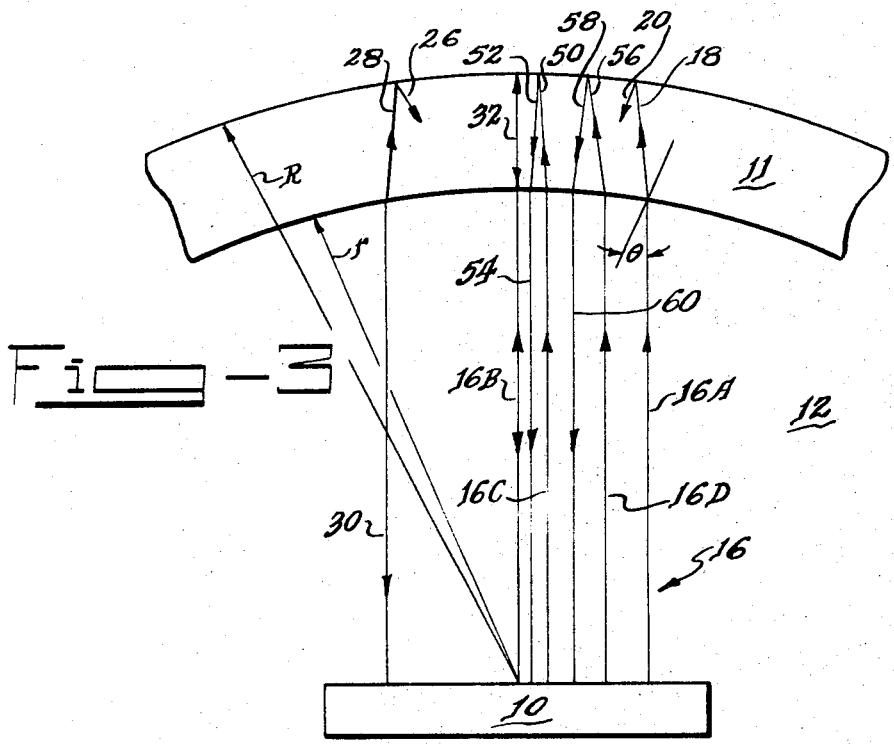
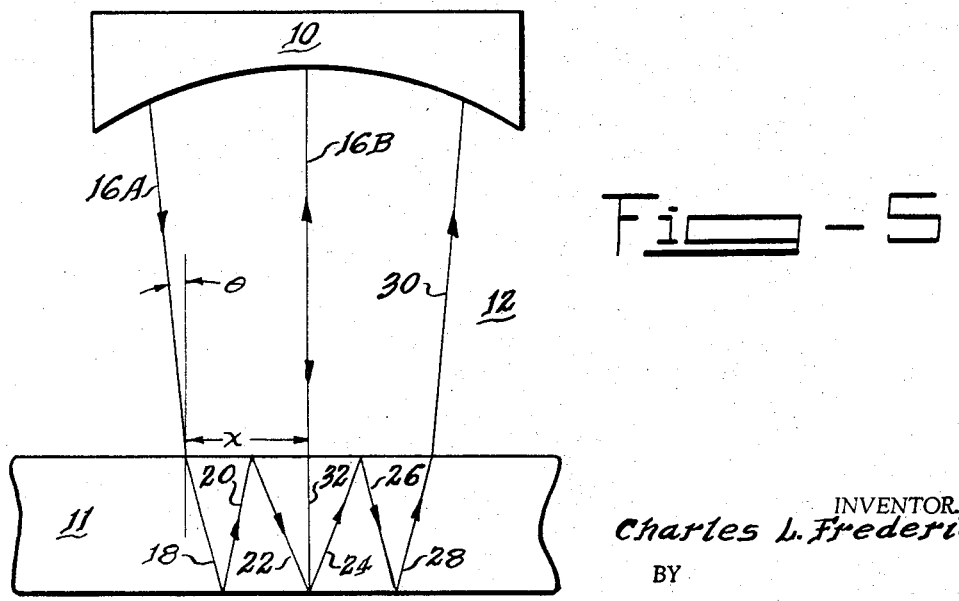
INVENTOR.
Charles L. Frederick
BY
Roland A. Anderson
Attorney

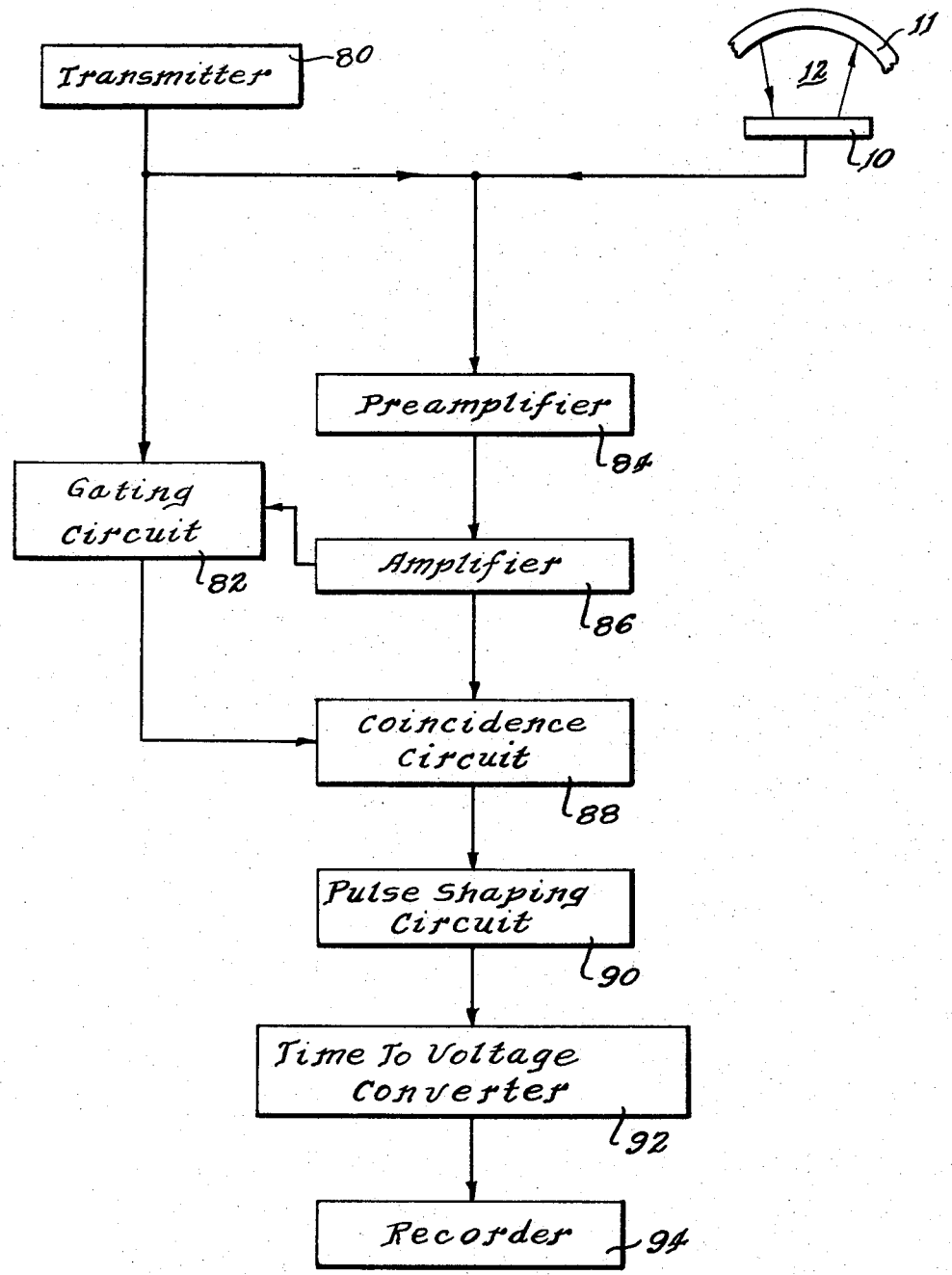

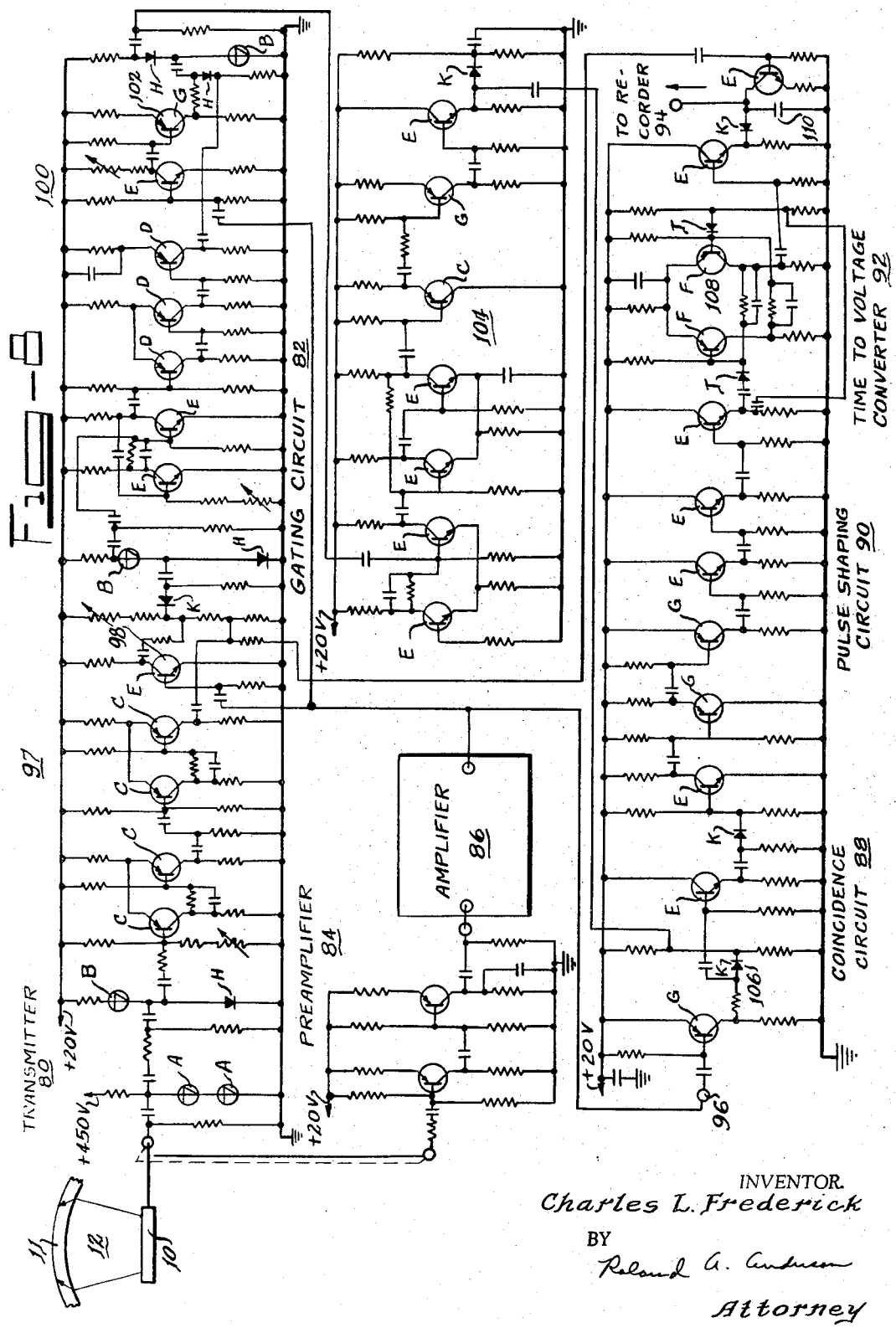

United States Patent Office 3,416,365
Patented Dec. 17, 1968

3,416,365
METHOD OF DETERMINING ELASTIC
PROPERTIES OF A METAL SAMPLE
Charles L. Frederick, Richland, Wash., assignor to the United States of America as represented by the United States Atomic Energy Commission
Filed Sept. 28, 1965, Ser. No. 491,063
10 Claims. (Cl. 73—67.9)

ABSTRACT OF THE DISCLOSURE

A method for determining the elastic properties of a sample includes generating and transmitting a pulsed ultrasonic wave to impinge on the surface of the sample to generate therein longitudinal ultrasonic waves, shear ultrasonic waves and complex longitudinal-shear ultrasonic waves. The generated longitudinal, shear and complex longitudinal-shear ultrasonic waves travel through the sample, generating ultrasonic plane waves radiating from the sample. The radiated ultrasonic plane waves are detected and the time intervals therebetween measured. These measured time intervals are a function of the elastic properties of the sample.

---

This invention relates to nondestructive testing techniques and more particularly to an ultrasonic method for nondestructively determining the eltastic properties of a metal sample. The invention described herein was made in the course of, or under, a contract with the U.S. Atomic Energy Commission.

Knowing the elastic properties of a metal is important both to the scientist and to the engineer. Throughout industry there exists the need for a method whereby the elastic properties, such as Young's modulus, Poisson's ratio and Shear modulus, of a metal may be nondestructively determined rapidly, accurately and independent of the thickness of the material. Further, there exists the need for nondestructively determining impurities and anisotropy in a metal which affect the elastic properties thereof.

Zircaloy–2, a zirconium alloy containing by weight 1.46% tin, 0.124% iron, 0.10% chromium and 0.050% nickel, is commonly used in the nuclear energy industry. It is a material used in the manufacture of nuclear reactor components. Absorption of a small amount (a few hundred p.p.m.) of hydrogen in Zircaloy–2 is enough of an impurity to cause embrittlement thereof which can result in failure of any components manufactured therefrom. As may readily be appreciated, failure of nuclear reactor components is undesirable both for reasons of safety and of cost.

Accordingly, it is one object of the present invention to provide a nondestructive method for determining the elastic properties of a metal.

It is another object of the present invention to provide a rapid and accurate nondestructive method for measuring the elastic properties of a metal independent of variations in thickness thereof.

It is another object of the present invention to provide a nondestructive method for determining impurities in a metal which affect the elastic properties thereof.

It is another object of the present invention to provide a nondestructive method for determining the presence of hydride in zirconium.

It is another object of the present invention to provide a non-destructive method for determining rapidly and accurately the presence of a few hundred p.p.m. of hydride in zirconium.

Other objects of the present invention will become more apparent as the detailed description proceeds.

In general, the present invention comprises exciting a transducer to generate a pulsed ultrasonic plane wave and focusing said ultrasonic wave to cause impingement thereof on the surface of a metal sample at a particular angle with respect thereto so as to generate longitudinal and shear ultrasonic waves therein. The longitudinal and shear waves travel through said sample and generate plane waves radiating therefrom. The radiated plane waves are focused on the transducer where they are detected to discriminate between waves radiated by shear waves and waves radiated by longitudinal waves, which discriminated waves are indicative of the elastic properties of the metal sample. Further understanding of the present invention may best be obtained by consideration of the accompanying drawings in which:

FIGURE 1 is a partial presentation of ultrasonic wave propagation according to the present invention.

FIGURE 2 is an amplitude versus time presentation of the ultrosonic waves shown in FIGURE 1 as detected by the transducer.

FIGURE 3 is a partial presentation of ultrasonic wave propagation according to the present invention.

FIGURE 4 is an amplitude versus time presentation of the ultrasonic waves shown in FIGURE 3 as detected by the transducer.

FIGURE 5 is a partial presentation of ultrasonic wave propagation according to the present invention for a curved transistor and flat sample.

FIGURE 7 is a block diagram of a circuit to measure the time intervals of the ultrasonic waves illustrated in FIGURES 2 and 4.

FIGURE 8 is a detailed embodiment of the apparatus of FIGURE 7.

Figure 6:
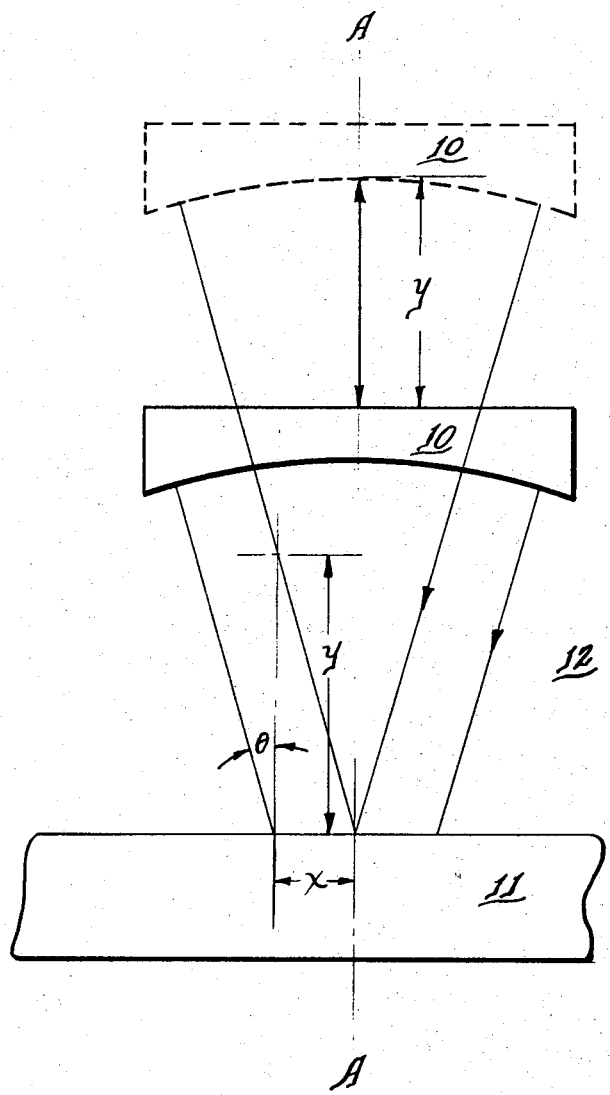
FIGURE 6 is a construction illustrating the determination of the incident angle of the ultrasonic wave for a flat sample and a curved transducer.

The elastic properties of a metal sample affect the velocities of longitudinal and shear waves in the metal sample. Similarly, small amounts of impurities in the metal sample which affect the elastic properties of the sample also affect the velocities of longitiudinal and shear waves within the sample. By comparing the velocities of longitudinal and shear waves within the metal sample, the elastic properties of the sample as well as the presence of small amounts of impurities therein may be determined.

To further understanding of the present invention, reference is made to FIGURE 1 wherein is shown wave propagation according to the present invention. It is to be understood that FIGURE 1 is a representation of only a portion of wave propagation from a transducer and a test object and that the portion has been so chosen to aid in describing and understanding the present invention.

In FIGURE 1, the transducer 10 is flat and is mounted spatially with respect to a curved test sample 11. The transducer 10 is ultrasonically coupled to the test sample 11 with a suitable couplant 12 such as water. The transducer 10 when electrically pulsed will produce a pulsed longitudinal ultrasonic plane wave 16 (shown in representative form), a portion 16A of which will impinge on the surface of the sample at an angle $\theta$ with respect thereto. For the practice of the present invention it is necessary that the angle $\theta$ be large enough so that the portion 16A of longitudinal wave 16 will produce a shear wave 18 within the test sample. A description will be given later stating how the value of angle $\theta$ for a particular sample is determined, it being sufficient for the present understanding that the correct angle $\theta$ will excite within the test sample 11 a shear wave 18. Shear wave 18 propagates through the test sample 12 and is reflected from the rear surface thereof. The reflection 20 is also a shear wave and propagates to the front surface of test sample 11 where it is reflected. The reflection 22 is a longitudinal wave that propagates through the test sample to the rear surface thereof where it is reflected. The reflection 24 is a longitudinal wave that propagates through the sample 11 to the front surface thereof where it is reflected. The reflection 26 is a shear wave that propagates through the sample 11 to the rear surface thereof where it is reflected as a shear wave 28. Shear wave 28 propagates through the sample 11 and enters the couplant 12. Shear wave 28 produces a longitudinal wave 30 at an angle $\theta'$ equal to the incident angle $\theta$ of wave 16A which is detected by the transducer 10. The foregoing is an illustration which hereinafter for the purposes of the present invention will be referred to as a complex wave reflection wherein it results from both shear and longitudinal ultrasonic reflected waves.

A portion 16B of the pulsed ultrasonic plane wave 16 impinges on test sample 11 normal to the surface thereof whereupon a portion is reflected and a portion generates longitudinal ultrasonic wave 32 which propagates through the sample 11 to the rear surface thereof. Longitudinal wave 32 is reflected from the rear surface of the sample 11 and propagated along its original path back to the front surface of the test sample 11 where a portion is again reflected and a portion is passed through the wall of sample 11 and transmitted back to the transducer 10. Longitudinal wave 32 continues this path of propagation, thereby giving a plurality of reflections from the rear surface of the test sample 11 which may be detected by the transducer 10. It is to be remembered, as hereinbefore stated, that FIGURE 1 is a representation of only a portion of wave propagation from transducer 10 and test sample 11.

To further understanding of the wave propagation hereinbefore described, reference is made to FIGURE 2 wherein is shown an amplitude versus time plot of ultrasonic waves detected by transducer 10. Pulse 34 is the electrical pulse which excites transducer 10. Pulse 36 is the first reflected longitudinal wave of wave 16B from the front surface of sample 11. Pulse 38 is the first reflected longitudinal wave 32 from the rear surface of the sample 11. Pulses 40, 42 and 44 are the second, third and fourth reflected longitudinal waves of wave 32 from the rear surface of the sample 11. Pulse 46 is the complex wave reflection comprising reflected waves 18, 20, 22, 24, 26 and 28. Pulse 48 is the fifth reflected longitudinal wave of wave 32 from the rear surface of the sample 11.

As stated supra, for the propagation of the complex wave reflection, it is necessary that a portion 16B of longitudinal wave 16 have an incident angle $\theta$ large enough to produce shear wave 18. To effect the correct angle $\theta$, the following technique is used. If a flat disc-shaped transducer 10 is used, the radius of the transducer must be greater than $R-r$ where $R$ is the radius of curvature from the center of the transducer 10 to the outer surface of the sample 11 and $r$ is the radius of curvature from the center of the transducer 10 to the inner surface of the sample 11. The angle $\theta$ may be obtained from the equation:

$$\theta = 2\left[\tan^{-1}\left(1-\frac{r}{R\cos\theta_1}\right)\right]\left[\tan\sin^{-1}\left(\frac{V_S X}{V_W(r)}\right)\right]$$
$$+\left[\tan^{-1}\left(1-\frac{r}{R\cos\theta_2}\right)\right]\left[\tan\sin^{-1}\left(\frac{V_L X}{V_W(r)}\right)\right]$$

where $R$=the radius of curvature from the center of the transducer 10 to the outer surface of the sample 11.
$r$=the radius of curvature from the center of the transducer 10 to the inner surface of the sample 11.
$\theta_1$=the angle subtended from the end points of shear wave 18 to the center of transducer 10.
$V_S$=the velocity of a shear wave in the test sample 11.
$V_W$=the velocity of a longitudinal wave in the coupling medium 12.
$V_L$=the velocity of a longitudinal wave in the test sample 11.

$X$=the distance from the center of transducer 10 to longitudinal wave 16A.
$\theta_2$=the angle subtended from the end points of shear wave 20 to the center of transducer 10.

This equation may be rewritten in terms of the sine function only:

$$\theta = \sin^{-1}\frac{V_S}{V_W}\sin\theta - \sin^{-1}\frac{r}{R}\frac{V_S}{V_W}\sin\theta$$
$$+\sin^{-1}\frac{V_L}{V_W}\sin\theta - \sin^{-1}\frac{r}{R}\frac{V_L}{V_W}\sin\theta$$

This equation may be solved by substituting therein approximate values for the shear and longitudinal velocities of waves in the test sample, since such are approximately known for the test sample 11 and the value for the velocity of longitudinal waves in the coupling medium which is also known. The equation may also be solved by computer methods wherein a set of curves are obtained relating the variables.

For a practical method of determining the angle $\theta$, the following technique has been found to be acceptable. The transducer 10 is positioned with respect to the sample until the complex wave reflection pulse 46 is detected by the transducer 10 before the fifth reflected longitudinal wave pulse 48. Masking of the transducer 10 is then gradually effected from the edge thereof to the center. At one point in the masking progression, the complex wave reflection pulse 46 will not be detected while the fifth reflected longitudinal wave pulse 48 will continue to be detected. This point, a distance $X$ from the center of the transducer 10, is the point of origin of the complex wave reflection. The incident angle $\theta$ is then determined from the formula:

$$\theta = \sin^{-1}\frac{X}{r}$$

where $X$=the distance from the center of the transducer 10 and the point described supra where the complex wave reflection pulse 46 disappeared and $r$=the radius of curvature from the center of the transducer 10 to the inner surface of the sample 11.

Since both longitudinal and shear ultrasonic waves are generated simultaneously in the test sample 11 by transducer 10 in the above-described techniques, the elastic properties such as Poisson's ratio, Shear and Young's modulus, and hydriding of the sample 11 may be determined therefrom. The shear and longitudinal velocities of the ultrasonic waves are obtained from the transit time of the direct reflected longitudinal, shear and complex wave pulses as detected by transducer 10. Utilizing these transit times, the aforementioned properties of the test sample 11 may be obtained.

To detect hydriding in the test sample 11 according to the present invention, it is preferred that the transit times of the reflected pulses 46 and 48 be used whereby maximum accuracy is obtained. Hydriding in the test sample 11 has a greater effect on the velocity of longitudinal than shear waves. Since pulse 46 is the resultant of multiple reflections within the sample 11, it will denote minute material changes in the sample 11. Accordingly, to detect hydriding in sample 11, it is preferred that pulses 46 and 48 be used. By comparing the transit time of pulse 46 in relation to pulse 48, minute material changes in sample 11 can be detected. It is to be noted that in hydriding detection, the transit time changes are measured and correlated to the transit time changes of a reference sample of known value. It is to be understood that anisotropy or cold work in the test sample 11 may be determined in the same manner as described for the determination of hydriding.

To measure Poisson's ratio according to the present invention, two methods may be used. The first is simpler but not quite as accurate as the second. As previously explained, FIGURE 1 is a representation of only a portion of wave propagation from the transducer 10 and sample 11 and was chosen to clearly portray wave propagation for the measurement of hydriding in the sample as well as understanding of the present invention. Reference is now made to FIGURE 3 wherein is shown a further portion of wave propagation from the transducer 10 and sample 11 which has been chosen to clearly portray how Poisson's ratio, Young's and Shear modulus are obtained therefrom.

In FIGURE 3 a portion 16C of longitudinal ultrasonic wave 16 impinges on the inner surface of test sample 11 and generates therein a shear wave 50 which propagates to the rear surface thereof where it is reflected. Shear wave 50 is reflected from the rear surface of sample 11 as a longitudinal wave 52 which propagates to the front surface of the sample 11. Longitudinal wave 52 produces longitudinal wave 54 which is detected by transducer 10. Another portion 16D of longitudinal ultrasonic wave 16 impinges on the surface of sample 11 so as to generate therein a shear wave 56 which propagates through the sample to the rear surface thereof whereupon it is reflected as a shear wave 58. Shear wave 58 propagates through the sample 11 to the front surface thereof whereupon it generates longitudinal wave 60 which is detected by transducer 10.

Reference is now made to FIGURE 4 wherein is shown an implitude versus time plot of ultrasonic waves detected by transducer 10. FIGURE 2 was a similar plot for the portion of wave propagation shown in FIGURE 1. FIGURE 4 is a plot corresponding to the wave propagation portion shown in FIGURE 3.

Pulse 34 is the pulse which excites transducer 10. Pulse 36 is the first reflected longitudinal wave of wave 16b reflected from the front surface of sample 11. Pulse 38 is the first reflected longitudinal wave 32 from the rear surface of the sample 11. Pulse 62 is the reflected wave resultant from shear and longitudinal waves 50 and 52. Pulse 64 is the reflected wave resultant from shear waves 56 and 58. Pulse 40 is the second reflected longitudinal wave of wave 32 from the rear surface of the sample 11. The time scale has been stretched between pulses 38 and 40 to clearly show pulses 62 and 64.

In measuring Poisson's ratio according to the present invention, the following formula is used:

$$\text{Poisson's ratio} = \delta = \frac{1 - 2\left(\frac{V_S}{V_L}\right)^2}{2 - 2\left(\frac{V_S}{V_L}\right)^2}$$

where $V_S$ = velocity in inches/sec. of shear waves within the test sample 11 and
$V_L$ = velocity in inches/sec. of longitudinal waves within the test sample 11.

$V_S$ and $V_L$ are determined according to the following formulae:

$$V_L = \frac{2d}{T_5 - T_2}$$

$$V_S = \frac{2d}{T_4 - T_1}$$

where $d$ = the thickness of the test sample 11 in inches.
$T_1$ = the time in seconds of return of pulse 36.
$T_2$ = the time in seconds of return of pulse 38.
$T_4$ = the time in seconds of return of pulse 64.
$T_5$ = the time in seconds of return of pulse 40.

Thus, knowing the values of $V_S$ and $V_L$ which have been determined from measured transit times, one may obtain Poisson's ratio from the following formula:

$$\delta = \frac{1 - 2\left(\frac{T_5 - T_2}{T_4 - T_1}\right)^2}{2 - 2\left(\frac{T_5 - T_2}{T_4 - T_1}\right)^2}$$

As previously mentioned, the foregoing described method is not as accurate as the following method.

In the second method the same formula $$\delta = \frac{1 - 2\left(\frac{V_S}{V_L}\right)^2}{2 - 2\left(\frac{V_S}{V_L}\right)^2}$$

is used. However, $V_L$ and $V_S$ are determined using different wave transit times for greater accuracy. In the second method $V_L$ and $V_S$ are determined using different wave transit times for greater accuracy. In the second method $V_L$ is determined from $$V_L = \frac{8d}{T_7 - T_2}$$

where $d$ = thickness of the test sample 11 in inches.
$T_2$ = the time in seconds of return of pulse 38.
$T_7$ = the time in seconds of return of pulse 48.

$$V_S = 2\left\{\frac{V_L R \sin\left[\sin^{-1}\left(\frac{V_S}{V_W}\sin\theta\right) - \sin^{-1}\left(\frac{r}{R}\frac{V_S}{V_W}\sin\theta\right)\right]}{\left[T_6 - T_1 + \frac{r}{V_W}(1 - \cos\theta)\right]\frac{V_L}{V_W}\sin\theta - 2R\sin\left[\sin^{-1}\left(\frac{V_L}{V_W}\sin\theta\right) - \sin^{-1}\left(\frac{r}{R}\frac{V_L}{wV}\sin\theta\right)\right]}\right\}^{1/2}$$

where $R$ = the radius of curvature from the center of the transducer 10 to the outer surface of the sample 11.
$r$ = the radius of curvature from the center of the transducer 10 to the inner surface of the sample 11.
$T_1$ = the time in seconds of the return of pulse 36.
$T_6$ = the time in seconds of the return of pulse 46.
$\theta$ = the angle of impingement of longitudinal ultrasonic wave 16A on the sample 11 (determined from $$\theta = \sin^{-1}\frac{X}{r}).$$

$V_W$ = the velocity in inches/sec. of longitudinal ultrasonic wave 16 in the coupling medium 12.
$V_L$ = the velocity in inches/sec. of longitudinal ultrasonic waves in the test sample 11 and is determined as shown above for the second method.

Using known computer methods wherein a set of curves are obtained relating the variables, the above equation for $V_S$ may be solved. Thus, knowing the various transit times, one may readily obtain the velocity of shear and longitudinal wave propagation in the sample 11 and hence the value of Poisson's ratio.

To obtain Young's modulus according to the present invention, the following formula is used:

$$Y = (V_L)^2 \rho \left[\frac{(1+\delta)(1-2\delta)}{(1-\delta)}\right]$$

where $V_L$ = the velocity in inches/sec. of longitudinal ultrasonic waves in the test sample 11 and is determined by any of the above methods.
$\rho$ = density of the test sample in lbs./in³.
$\sigma$ = Poisson's ratio as measured by either of the aforementioned methods.

The density $\rho$ of the test sample 11 may be approximated from known values for the material of the sample or it may accurately be determined by known conventional techniques for the particular sample under test.

To obtain Shear modulus according to the present invention, the following formula is used:

$$\text{Shear modulus} = (V_S)^2 \rho$$

where $V_S$ = the shear velocity in inches/sec. as measured by any of the foregoing techniques and
$\rho$ = the density of the sample 11 in lbs./in.$^3$ as described supra.

It is to be noted that the aforementioned description has been directed to a curved test sample 11 and a flat transducer. The present invention is not to be limited thereto. It is readily obvious that a flat sample 11 may be used and the transducer 10 be curved. Such a relationship is shown in FIGURE 5, the wave propagation therein being the same as hereinbefore described for FIGURES 1–4. To determine the incident angle $\theta$ of portion 16A longitudinal ultrasonic wave 16 for generation of shear wave 18 therefrom, the following technique should be followed using a curved transducer. The transducer 10 should be adjusted until the focal point thereof engages the adjacent surface of the test sample as shown in FIGURE 6 in dotted lines. The transducer 10 is then moved along line A—A towards the adjacent surface of the test sample until the complex wave reflection pulse 46 is detected. The amount of movement of the transducer 10 along line A—A from its initial position towards sample 11 until the aforementioned reflected waves are detected is noted. This is distance Y as shown in FIGURE 6. The sample 11 is then gradually masked starting from the outer edge thereof towards the line A—A. At one point in the masking, the complex wave reflection pulse 46 will disappear and not be detectable while the fifth reflected longitudinal wave pulse 48 will continue to be detected. This point, a distance X from the line A—A, is the point at which longitudinal wave 16A impinges on sample 11 to generate shear wave 18 therein. The incident angle $\theta$ of longitudinal wave 16A on test sample is then determined from the formula $$\theta = \tan^{-1} \frac{Y}{X}$$

where $Y$ = the amount of movement of transducer 10 along line A—A as described supra to produce the complex wave reflection pulse 46 and $X$ = the distance from the line A—A to the point described supra where the complex wave reflection pulse 46 disappeared.

It is to be noted that when a curved transducer 10 as shown in FIGURE 5 is being used, then Poisson's ratio may also be determined from the first method described supra, to wit:

$$\sigma = \frac{1 - 2\left(\frac{V_S}{V_L}\right)^2}{2 - 2\left(\frac{V_S}{V_L}\right)^2}$$

where $$V_L = \frac{2d}{T_5 - T_2}$$

and $$V_S = \frac{2d}{T_4 - T_1}$$

the nomenclature designations being as hereinbefore described. Young's and Shear modulus are obtained in the same manner as for a flat transducer and curved sample.

Thus, it is apparent that my measuring the pulse transit times of shear and longitudinal waves simultaneously generated within the test sample 11, one may readily obtain therefrom Poisson's ratio, Young's and Shear modulus, and hydriding of the sample 11.

Turning now to FIGURE 7, a block diagram is shown for an apparatus wherewith the aforedescribed reflected wave pulses are detected and the transit times thereof measured to give the desired elastic properties of test sample 11. A transmitter 80 transmits pulsed output signals to transducer 10 and a gating circuit 82. Transducer 10 responsive thereto transmits a pulsed longitudinal ultrasonic wave 16 as hereinbefore described to test sample 11. Reflected waves from test sample 11, generated as hereinbefore described, are detected by transducer 10 and transmitted to a preamplifier 84. The output from preamplifier 84 is amplified by an amplifier 86 and fed to the input of a coincidence circuit 88 and to a gating circuit 82. Gating circuit 82 responsive to received reflected wave pulses conditions coincidence circuit 88 to pass particular predetermined reflected wave pulses. After passage by coincidence circuit 88, the desired reflected wave pulses are transmitted to a pulse shaping circuit 90 and thence to a time-to-voltage converter 92 where an output pulse results which is proportional in amplitude to the time difference between the selected pulses. The output of converter 92 is fed to a recorder 94 for storage and display.

A detailed embodiment of the apparatus of FIGURE 7 is shown in FIGURE 8. FIGURE 8 as shown is connected for detection of hydriding in Zircaloy-2 and the following detailed description is directed thereto. For hydriding detection and for other elastic tests hereinbefore described, it is desirable that the exciting pulse of transducer 10 have a pulse length of $$t < \frac{d}{2V_L}$$

where $t$ = the pulse length.
$d$ = the thickness of the test sample 11.
$V_L$ = the longitudinal velocity of ultrasonic waves in the test sample 11 (this is approximated from known values of the material of the test sample 11).

Further, it is requisite that the frequency used be low enough to obtain five useable echoes from longitudinal wave reflections (pulses 38, 40, 42, 44 and 48 hereinbefore described). This frequency is dependent on the thickness and attenuation of the material of test sample 11. As previously mentioned, the transducer 10 must have a surface radius (if circular) which is greater than the thickness of the test sample 11.

As stated, this description is directed to Zircaloy-2 having a thickness of approximately ⅜ of an inch and an inner radius of curvature of approximately 1.2 inches. The transmitter 80 containing Shockley diodes operates at a rate of 2000 pulses per second and a frequency of 5 megacycles. The transmitter 80 drives transducer 10 (approximately ¾ of an inch in diameter) to generate pulsed longitudinal ultrasonic waves 16 which travel through a water couplant 12 to impinge on the surface of test sample 11 at an angle of 8 degrees with respect thereto. As previously described, longitudinal waves 16 simultaneously generate shear and longitudinal waves within the sample which are reflected back to the transducer. The reflected wave pulses are detected by transducer 10 and transmitted to a preamplifier 84 and amplifier 86. The output from amplifier 86 is fed to a multistage gating circuit 82 and an input 96 of coincidence circuit 88. The transmitter output, pulse 34, triggers the first stage 97 of gate circuit 82, so that when the first reflected longitudinal wave pulse 36 from the front surface of the sample 11 is detected, transistor 98 is caused to become conducting and trigger the second stage 100 of gate circuit 82. The second stage 100 operates so that when the second reflected longitudinal wave pulse 40 from the rear surface of the sample 11 is detected, transistor 102 is caused to become conducting. The output from the second stage 100 triggers the signal gate generator 104 section of gating circuit 82 which positions a gating signal for time coincidence gating of the desired reflected wave pulse. It is to be noted that the first stage 97 locks in on the first reflected longitudinal wave pulse 36 from the front surface of the test sample 11. This allows movement between transducer 10 and sample 11 without losing desired signals. Further, the locking in of the second stage on the second reflected longitudinal wave pulse 40 from the rear surface of the sample 11 allows wall thickness variations in the test sample 11 without loss of desired signals.

The output of the signal gate generator section 104 is fed to coincidence circuit 88, where, using a diode gate 106, coincidence is effected to pass the desired reflected wave pulses. For the hydriding test, the desired reflected wave pulses are pulses 46 and 48. Thus, diode gate 106 is operated to permit the transmission therethrough of pulses 46 and 48 and the resultant signal output from coincidence circuit 88 is two pulses separated in time by 200 to 500 nanoseconds dependent upon the hydride concentration in the test sample 11. These pulses are shaped in pulse shaping circuit 90 comprising a multistage differentiating amplifier which shapes the pulses to provide pulses short in duration and having rapid rise and fall times. The output signal from the pulse shaping circuit 90 is two pulses three to five volts positive, having approximately a 15 nanosecond rise time, and separated in time to 200 to 500 nanoseconds.

The output from pulse shaping circuit 90 is fed to a time-to-voltage converter 92. In the time-to-voltage converter 92, a fast response univibrator 108 is triggered by the first pulse and turned off by the following pulse wherefrom a pulse is generated having a time duration equal to the pulse separation time. This pulse is then used to charge a capacitor through a high back resistance diode. Operating in the linear portion of the charge curve, the voltage on the capacitor 110 is proportional to the pulse width and hence to the time separation of pulses 46 and 48. A transistor switching circuit is used to discharge the capacitor 110 every repetition so that the capacitor 110 is ready for the next signal transmission. The output from the time-to-voltage converter 92 is fed to a high impedance D.C. recorder 94.

Thus, a measure of the time separation of reflected ultrasonic waves 46 and 48 from test sample 11 is obtained and, upon comparison with a sample of known hydriding content, will furnish a measurement of hydriding in the test sample within a few hundred parts per million.

In the aforedescribed circuit of FIGURE 8, the following designations have been used for the transistor types shown therein.

A—4D200   F—2N1749
B—4E200   G—2N502
C—2N247   H—1N303
D—2N396   J—1N270
E—2N338   K—DR403

It is to be noted that the test sample 11, although shown as flat and curved, may be tubular and that either the test sample may be rotated about the transducer or the transducer rotated about the test sample to effect complete scan coverage thereabout. If the transducer 10 is rotated, then it is understood that electrical connections to the transducer 10 will be made through a suitable coupling such as a rotary transformer.

The circuit of FIGURE 8 has been described supra for the measurement of $T_7-T_6$ (the difference in time between reflected wave pulses 46 and 48) whereby hydriding of the test sample 11 may be measured. It is readily obvious that the detailed circuit may be similarly used with minor gating modifications to measure the time periods $T_5-T_2$, $T_4-T_1$, $T_7-T_2$, and $T_6-T_1$ for the computation of Poisson's ratio, Young's and Shear modulus according to the present invention.

Accordingly, the scope of protection afforded the present invention should not be limited to the particular embodiments and methods described and shown above but shall be determined only in accordance with the appended claims.

The embodiments of the invention in which an exclusive property or privilege is claimed are defined as follows:

1. A method for determining the elastic properties of a sample comprising generating and transmitting from a transducer a beam of pulused ultrasonic plane waves to impinge on the surface of said sample, said sample and said transducer having a relative curved-surface relationship therebetween whereby a portion of said beam is normal to the sample surface and other portions of the beam are at angles other than normal to the sample surface to generate in said sample longitudinal and shear ultrasonic waves, said generated longitudinal and shear ultrasonic waves traveling through a section of said samples having relatively constant thickness in the direction of such travel, said generated longitudinal and shear ultrasonic waves traveling through said sample generating ultrasonic plane waves radiating from said sample, detecting from the transmitting transducer side of said sample said radiated ultrasonic plane waves, and measuring the time intervals between said detected ultrasonic waves, which measured time intervals are a function of the elastic properties of said sample.

2. A method for determining the elastic properties of a sample comprising generating and transmitting from a transducer a beam of pulsed ultrasonic plane waves to impinge on the surface of said sample, said sample and said transducer having a relative curved-surface relationship therebetween whereby a portion of said beam is normal to the sample surface and other portions of the beam are at angles other than normal to the sample surface to generate in said sample longitudinal ultrasonic waves, shear ultrasonic waves, and complex longitudinal-shear ultrasonic waves; said generated longitudinal, shear and complex ultrasonic waves traveling through a section of said sample having relatively constant thickness in the direction of such travel; said generated longitudinal, shear and complex ultrasonic waves traveling through said sample generating ultrasonic plane waves radiating from said sample; detecting from the transmitting transducer side of said sample said radiated ultrasonic plane waves; and measuring the time intervals between said detected ultrasonic plane waves, which measured time intervals are a function of the elastic properties of said sample.

3. A method for detecting hydriding in a sample comprising generating and transmitting from a transducer a pulsed ultrasonic plane wave beam to impinge on the surface of said sample, said sample and said transducer having a relative curved-surface relationship therebetween whereby a portion of said beam is normal to the sample surface and other portions of the beam are at angles other than normal to the sample surface to generate in said sample longitudinal and complex longitudinal-shear ultrasonic waves, said generated longitudinal and complex longitudinal-shear ultrasonic waves traveling through a section of said sample having relatively constant thickness in the direction of such travel, said generated longitudinal and complex longitudinal-shear waves traveling through said sample generating ultrasonic plane waves radiating from said sample, detecting from the transmitting transducer side of said sample said radiated ultrasonic plane waves, and measuring the time interval between said detected ultrasonic plane waves, which measured time intervals are a function of hydriding of said sample.

4. A method for detecting hydriding in a sample comprising generating and transmitting from a transducer a pulsed ultrasonic plane wave beam to impinge on the surface of said sample, said sample and said transducer having a relative curved-surface relationship therebetween whereby a portion of said beam is normal to the sample surface and other portions of the beam are at angles other than normal to the sample surface to generate in said sample a longitudinal and a complex longitudinal-shear ultrasonic wave, said generated longitudinal and complex longitudinal-shear ultrasonic waves traveling through a section of said sample having relatively constant thickness in the direction of such travel, said longitudinal ultrasonic wave traveling through said sample and being multiply reflected from the rear surface thereof, each of the reflections of said longitudinal ultrasonic wave generating an ultrasonic plane wave radiating from said sample, said complex longitudinal-shear wave traveling through said sample generating an ultrasonic plane wave radiating from said sample, detecting said radiated ultrasonic plane waves, and measuring the time interval between the detected ultrasonic wave generated by said complex longitudinal-shear wave and the detected ultrasonic wave generated by the fifth reflected longitudinal ultrasonic wave, which time interval is a measure of hydriding within said sample.

5. A method of detecting hydriding in a sample comprising generating and transmitting from a transducer a pulsed ultrasonic plane wave beam to impinge on the surface of said sample, said sample and said transducer having a relative curved-surface relationship therebetween whereby a portion of said beam is normal to the sample surface and other portions of the beam are at angles other than normal to the sample surface to generate in said sample a longitudinal and a complex longitudinal-shear ultrasonic wave, said generated longitudinal and complex longitudinal-shear ultrasonic waves traveling through a section of said sample having relatively constant thickness in the direction of such travel, said generated longitudinal wave traveling through said sample and being multiply reflected from the rear surface thereof, each of the reflections of said longitudinal ultrasonic wave generating an ultrasonic plane wave radiating from said sample, said complex longitudinal-shear wave traveling through said sample generating an ultrasonic plane wave radiating from said sample, detecting with said transducer said radiated ultrasonic plane waves, said detected ultrasonic plane waves being thereby converted to electrical pulses, amplifying said detected electrical pulses, transmitting said detected electrical pulses to a coincidence circuit, gating said coincidence circuit with an electrical pulse to permit passage therethrough of only the detected electrical pulse generated by said complex longitudinal-shear wave and the detected electrical pulse generated by the fifth reflected longitudinal ultrasonic wave, generating an electrical pulse proportional in voltage amplitude to the time duration between the pulse generated by said complex longitudinal-shear wave and the pulse generated by the fifth reflected longitudinal ultrasonic wave, and recording said voltage proportional pulse, the voltage thereof being a measure of hydriding in said sample.

6. A method of measuring Poisson's ratio, Young's modulus and Shear modulus of a sample comprising generating and transmitting from a transducer a pulsed ultrasonic plane wave beam to impinge on the surface of said sample, said sample and said transducer having a relative curved-surface relationship therebetween whereby a portion of said beam is normal to the sample surface and other portions of the beam are at angles other than normal to the sample surface to generate in said sample a longitudinal and a shear ultrasonic wave, a portion of said transmitted pulsed ultrasonic plane wave beam being reflected from the front surface of said sample, said generated longitudinal and shear ultrasonic wave traveling through a section of said sample having relatively constant thickness in the direction of such travel, said longitudinal ultrasonic wave traveling through said sample and being multiply reflected from the rear surface thereof, each of the reflections of said longitudinal ultrasonic wave generating an ultrasonic plane wave radiating from said sample, said shear wave traveling through said sample generating an ultrasonic plane wave radiating from said sample, detecting said radiated ultrasonic plane waves and the reflected portion of said pulsed ultrasonic wave, and measuring the time intervals between said detected ultrasonic plane waves, and combining said measured time intervals to obtain a value of Poisson's ratio, Young's modulus and Shear modulus of said sample.

7. A method of measuring Poisson's ratio of a sample comprising generating and transmitting from a transducer a pulsed ultrasonic plane wave beam to impinge on the surface of said sample, said sample and said transducer having a relative curved-surface relationship therebetween whereby a portion of said beam is normal to the sample surface and other portions of the beam are at angles other than normal to the sample surface to generate in said sample a longitudinal and a shear ultrasonic wave, a portion of said transmitted pulsed ultrasonic plane wave beam being reflected from the front surface of said sample, said generated longitudinal and shear ultrasonic wave traveling through a section of said sample having relatively constant thickness in the direction of such travel, said longitudinal ultrasonic wave traveling through said sample and being multiply reflected from the rear surface thereof, each of the reflections of said longitudinal ultrasonic wave generating an ultrasonic plane wave radiating from said sample, said shear wave traveling through said sample generating an ultrasonic plane wave radiating from said sample, detecting said radiated ultrasonic plane waves and the front surface reflected portion of said pulsed ultrasonic wave, measuring the time interval between the detected ultrasonic wave generated by said shear ultrasonic wave and the detected ultrasonic wave reflected from the front surface of said sample, measuring the time interval between the detected ultrasonic wave generated by the second reflected longitudinal ultrasonic wave and the detected ultrasonic wave generated by the first reflected longitudinal ultrasonic wave, and combining said measured time intervals to obtain a value of Poisson's ratio for said sample.

8. The method according to claim 7 wherein said measured time intervals are substituted into the equation $$\frac{1-2\left(\frac{T_5-T_2}{T_4-T_1}\right)^2}{2-2\left(\frac{T_5-T_2}{T_4-T_1}\right)^2}$$

wherefrom the value of Poisson's ratio is obtained, $T_5-T_2$ being the measured time interval between the detected ultrasonic wave generated by the second reflected longitudinal ultrasonic wave and the detected ultrasonic wave generated by the first reflected longitudinal ultrasonic wave, $T_4-T_1$ being the measured time interval between the detected ultrasonic wave generated by said shear ultrasonic wave and the detected ultrasonic wave reflected from the front surface of said sample.

9. A method of measuring Young's modulus of a sample comprising generating and transmitting from a transducer a pulsed ultrasonic plane wave beam to impinge on the surface of said sample, said sample and said transducer having a relative curved-surface relationship therebetween whereby a portion of said beam is normal to the sample surface and other portions of the beam are at angles other than normal to the sample surface to generate in said sample a longitudinal and a shear ultrasonic wave, a portion of said transmitted pulsed ultrasonic plane wave beam being reflected from the front surface of said sample, said generated longitudinal and shear ultrasonic wave traveling through a section of said sample having relatively constant thickness in the direction of such travel, said longitudinal ultrasonic wave traveling through said sample and being multiply reflected from the rear surface thereof, each of the reflections of said longitudinal ultrasonic wave generating an ultrasonic plane wave radiating from said sample, said shear wave traveling through said sample generating an ultrasonic plane wave radiating from said sample, detecting said radiated ultrasonic plane waves and the front surface reflected portion of said pulsed ultrasonic wave, measuring the time $T_4-T_1$ between the detected ultrasonic wave generated by said shear ultrasonic wave and the detected ultrasonic wave reflected from the front surface of said sample, measuring the time interval $T_5-T_2$ between the detected ultrasonic wave generated by the second reflected longitudinal ultrasonic wave and the detected ultrasonic wave generated by the first reflected longitudinal ultrasonic wave, obtaining the density $\rho$ of the test sample, and substituting $T_5-T_2$, $T_4-T_1$ and $\rho$ in the equation $$\left(\frac{2d}{T_5-T_2}\right)^2 \rho \left\{ \frac{\left[1+\frac{1-2\left(\frac{T_5-T_2}{T_4-T_1}\right)^2}{2-2\left(\frac{T_5-T_2}{T_4-T_1}\right)^2}\right]\left[1-2\left(\frac{1-2\left(\frac{T_5-T_2}{T_4-T_1}\right)^2}{2-2\left(\frac{T_5-T_2}{T_4-T_1}\right)^2}\right)\right]}{1-\frac{1-2\left(\frac{T_5-T_2}{T_4-T_1}\right)^2}{2-2\left(\frac{T_5-T_2}{T_4-T_1}\right)^2}} \right\}$$

wherefrom the value of Young's modulus is obtained.

10. A method of measuring Shear modulus of a sample comprising generating and transmitting from a transducer a pulsed ultrasonic plane wave beam to impinge on the surface of said sample, said sample and said transducer having a relative curved-surface relationship therebetween whereby a portion of said beam is normal to the sample surface and other portions of the beam are at angles other than normal to the sample surface to generate in said sample a longitudinal and a shear ultrasonic wave, a portion of said transmitted pulsed ultrasonic plane wave beam being reflected from the front surface of said sample, said generated longitudinal and shear ultrasonic wave traveling through a section of said sample having relatively constant thickness in the direction of such travel, said longitudinal ultrasonic wave traveling through said sample and being multiply reflected from the rear surface thereof, said shear wave traveling through said sample generating an ultrasonic plane wave radiating from said sample, detecting said radiated ultrasonic plane wave and the front surface reflected portion of said pulsed ultrasonic wave, measuring the time $T_4-T_1$ interval between the detected ultrasonic wave generated by said shear ultrasonic wave and the detected ultrasonic wave reflected from the front surface of said sample, obtaining the density $\rho$ of said sample, measuring the thickness $d$ of the sample and substituting $T_4-T_1$, $d$, and $\rho$ into the equation $$\left(\frac{d}{T_4-T_1}\right)^2 \rho$$

wherefrom the value of Shear modulus is obtained.

References Cited

UNITED STATES PATENTS

| | | | |
|---|---|---|---|
| 2,592,134 | 4/1952 | Firestone | 73—67.8 |
| 2,706,906 | 4/1955 | Rich | 73—67.5 XR |
| 3,250,120 | 5/1966 | Dickenson | 73—67.6 |

RICHARD C. QUEISSER, *Primary Examiner.*

JOHN P. BEAUCHAMP, *Assistant Examiner.*